US007320205B2

United States Patent
Cooper et al.

(10) Patent No.: US 7,320,205 B2
(45) Date of Patent: Jan. 22, 2008

(54) METHOD FOR MANUFACTURING FILTER CANISTERS AND TRACKING QUALITY ASSURANCE

(75) Inventors: Peter J. Cooper, North Potomac, MD (US); Stephen Kubicsko, Westminster, MD (US); Greg A. Tilley, Monkton, MD (US)

(73) Assignee: TVI Corporation, Glenn Dale, MD (US)

(*) Notice: Subject to any disclaimer, the term of this patent is extended or adjusted under 35 U.S.C. 154(b) by 440 days.

(21) Appl. No.: 11/049,073

(22) Filed: Feb. 2, 2005

(65) Prior Publication Data

US 2006/0169749 A1 Aug. 3, 2006

(51) Int. Cl.
*B65B 7/28* (2006.01)
*B65B 51/22* (2006.01)

(52) U.S. Cl. .................. 53/476; 228/110.1; 55/DIG. 5

(58) Field of Classification Search ............ 55/DIG. 5, 55/DIG. 33; 95/90, 901; 96/108, 134, 147, 96/149; 210/282, 484; 228/110.1; 53/476
See application file for complete search history.

(56) References Cited

U.S. PATENT DOCUMENTS 2,739,916 A 3/1956 Parker ......................... 154/81
4,626,307 A 12/1986 Cherkas et al. ............. 156/218
5,062,874 A * 11/1991 Legare et al. ................. 55/337
5,114,511 A 5/1992 Goodfellow ................ 156/133
5,698,059 A 12/1997 Bilski et al. ............ 156/273.5
5,942,060 A * 8/1999 Berger ......................... 156/69
5,987,951 A 11/1999 Saunders ....................... 72/69
6,146,449 A * 11/2000 Lee et al. .................. 96/117.5
6,247,857 B1 6/2001 Wheeler et al. ............ 396/567
6,533,839 B2 * 3/2003 Janisch et al. ................. 95/25
6,616,785 B2 9/2003 Hedlund et al. ............ 156/218
6,710,012 B2 * 3/2004 Funke et al. ................ 502/416
6,773,217 B2 8/2004 Sinsel et al. .................... 413/1
6,817,466 B2 11/2004 Osterfeld et al. ........ 198/418.2
6,821,321 B2 11/2004 Chinn et al. .................. 96/108
2005/0160911 A1 * 7/2005 Friday et al. ................. 96/134
2006/0157391 A1 * 7/2006 Astle et al. ................... 210/85

* cited by examiner

*Primary Examiner*—Frank M. Lawrence
(74) *Attorney, Agent, or Firm*—Whiteford, Taylor & Preston LLP; Jeffrey C. Maynard; Gregory M. Stone

(57) ABSTRACT

An assembly line for manufacturing filter canisters is disclosed. The method for assembling filter canisters provides a unique serial number for each canister and a database that associates the component lot numbers, activated charcoal weight, and quality assurance test results with the serial number for the filter canister. The manufacturing method can be adapted for assembly of canisters with activated charcoal and an aerosol HEPA filter, canisters with activated charcoal only, and canisters with an aerosol HEPA filter only. Some embodiments can also enable different testing conditions and specifications, activated charcoal loading requirements, labeling specifications, and packaging requirements.

21 Claims, 1 Drawing Sheet

METHOD FOR MANUFACTURING FILTER CANISTERS AND TRACKING QUALITY ASSURANCE

BACKGROUND OF THE INVENTION

1. Field of the Invention

This invention relates generally to a method for manufacturing filter canisters, and more particularly to a method that includes quality testing of each filter canister during manufacture and individually serializing each filter canister to maintain a record of the results of such quality testing.

2. Background of the Prior Art

Typically, filter canisters are manufactured in an automated assembly line by assembling component parts from a variety of sources. While the various components may be delivered by lot numbers, there is no process that correlates any of the component lot numbers with a finished product. It would be desirable to have a system to track all the component parts used to manufacture a filter canister and record the actual results of testing performed on that filter. Therefore, there is an unmet need in the art for a process to manufacture filter canisters for a variety of uses and to track the parts and testing performed on the filter canisters on an individual basis.

No system and process is currently known to enable automatic manufacture of filter canisters for a variety of applications while recording completion of the manufacturing steps and results of quality assurance testing. The present invention herein solves these problems by providing a computer based system that allows for a certification of the manufacturing process with traceable objective quality evidence review of testing performed on individual products.

SUMMARY OF THE INVENTION

The present invention provides a solution to the above and other problems by enabling a filter canister manufacturing assembly line having computerized control of the assembly process with automatic input of component information and quality assurance test results. The construction of the assembly line permits manual interaction with one or more operators. In a preferred embodiment of the system described herein, the system tests and labels each filter canister, and assigns a unique serial number to each canister. The serial number is recorded in a computerized database and associates the specific filter canister with its component part lot numbers, activated charcoal weight, and test results for specified quality assurance tests.

According to one embodiment of the present invention, an assembly line for manufacturing filter canisters is disclosed. The assembly process may be performed in series or, for some steps, may be performed in parallel. The process begins with manually combining a filter canister body with a lower retainer element and a fines filter. The body is placed in a transportable pallet for carriage through the assembly line. The body, lower retainer element, and lower fines filter are ultrasonically welded together and the body is provided with a barcode indication to track through the rest of the assembly process. Next, the body is filled with a predetermined amount of activated charcoal. The body is then weighed. If there is insufficient weight, the canister is rejected, at which point it will be removed from the assembly line, emptied, and returned to the line. If, however, the weight is within a prescribed tolerance, the result is recorded in a database associated with the barcode, and the canister continues with the process. Next, another fines filter and an upper retainer are manually placed in the container. The activated charcoal is compressed and the upper retainer and fines filter are ultrasonically welded in place. Then a pleated HEPA filter and body cap are manually placed on the container and ultrasonically welded in place. After the top is in place, a small amount of liquid urethane is squirt into the container and a spin seal process seals the HEPA filter in place. At this stage, a unique serial number is assigned to the canister. The canister then undergoes an airflow resistance test and a DOP test. The test results are recorded in the database associated with the unique serial number. If the canister passes the tests, it is labeled and packaged for shipment. If the canister fails the test, it is rejected and may be deconstructed to determine the cause of such failure.

It is, therefore, an object of the present invention to provide a filter canister assembly plant that avoids the disadvantages of the prior art.

It is another object of the present invention to provide a method for assembling filter canisters that provides a unique serial number for each canister. A related object is to provide a database that associates the component lot numbers, activated charcoal weight, and quality assurance test results with a serial number for the filter canister.

The manufacturing method described herein can be adapted for assembly of canisters with activated charcoal and an aerosol HEPA filter, canisters with activated charcoal only, and canisters with an aerosol HEPA filter only. Some embodiments can also enable different testing conditions and specifications, activated charcoal loading requirements, labeling specifications, and packaging requirements.

The various features of novelty that characterize the invention will be pointed out with particularity in the claims of this application.

BRIEF DESCRIPTION OF THE DRAWINGS

The above and other features, aspects, and advantages of the present invention are considered in more detail, in relation to the following description of embodiments thereof shown in the accompanying drawings, in which.

DETAILED DESCRIPTION OF THE INVENTION

Figure 1:
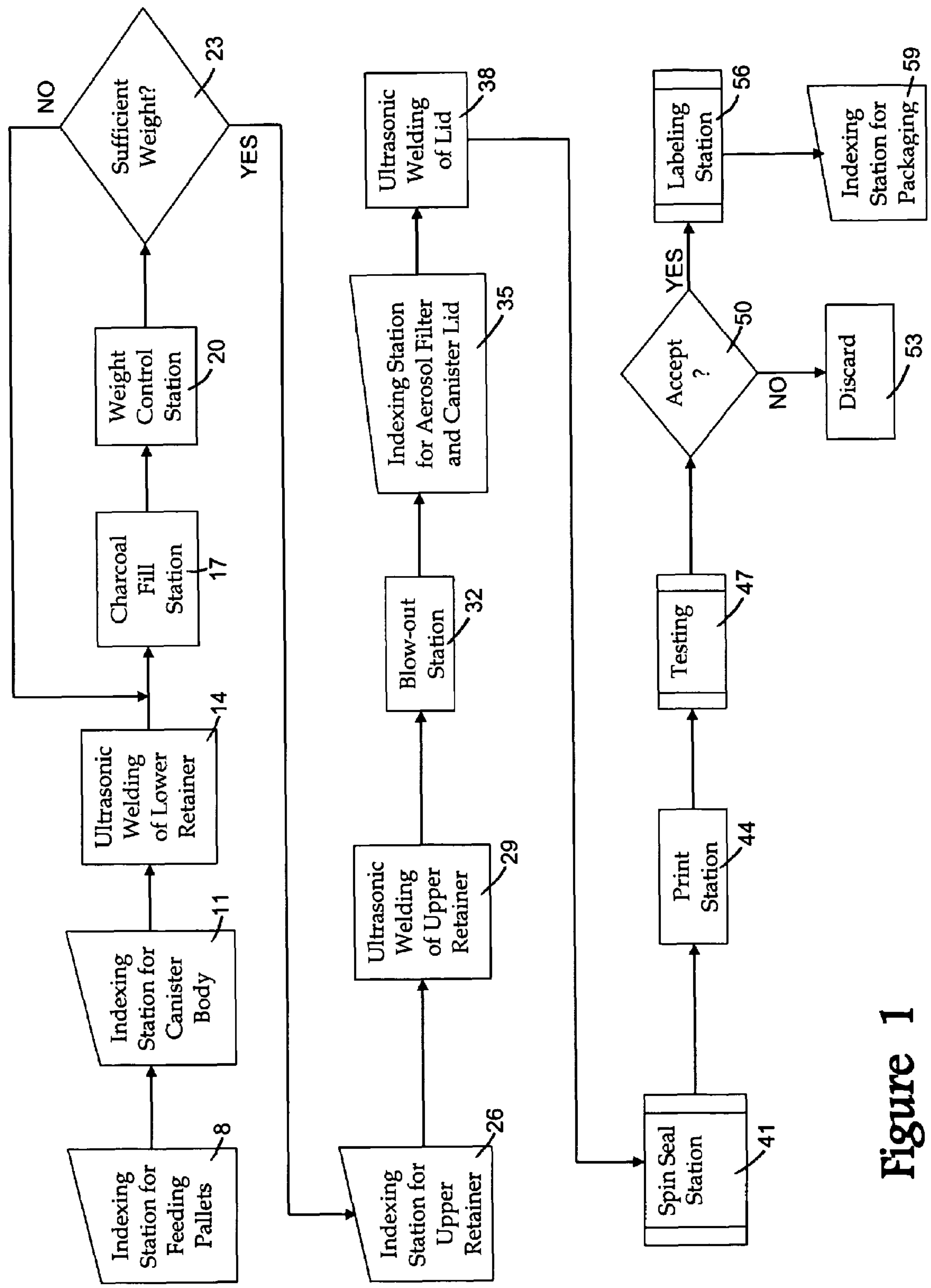
FIG. 1 shows a general flow chart presentation for describing steps in a specific embodiment of the present invention.

The invention summarized above and defined by the enumerated claims may be better understood by referring to the following description, which should be read in conjunction with the accompanying drawings in which like reference numbers are used for like parts. This description of an embodiment, set out below to enable one to build and use an implementation of the invention, is not intended to limit the enumerated claims, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

By way of overview, the present invention provides a method wherein a canister is labeled with a bar code, then throughout the process of each stage of the production line the system is capable of recording the data for that coded canister, resulting in a point-to-point quality plan, which is unique in the filter manufacturing industry. Each coded canister is serialized for tracking and data recording purposes.

The production line comprises a plurality of workstations at which steps in the assembly process are completed. The stations are connected by conveyors for transporting pallets having the filter thereon. Through each workstation and process in the production line, the pallet/filter is transported and transferred by a conveyor system. The conveyor is driven by one gear motor. Conveyor speed is calculated and chosen according to the nominal cycle time of the process. After the final process step is passed, the empty pallet is transferred back to the start of the assembly line by a single-track return conveyor. The conveyor length is adapted o the layout.

In a production line for plastic filter canisters, the following operations are integrated, as follows:

0. Indexing station for feeding empty pallets to the production line from the return conveyor.
1. Indexing station for manual loading of filter canister housings with fines filter and bottom retainer to pallets.
2. Ultra-sonic welding station.
3. Charcoal fill station.
5. Weight control station with reject function.
5. Indexing station for manual placing of the upper retainer.
6. Upper retainer weld station.
7. Blow-out (rinsing) station.
8. Indexing station for manual placing of lid and aerosol filter.
9. Ultra-sonic lid weld station.
10. Ink Jet print station integrated with pick and place robot for loading filters to a Spin Seal Process.
11. Separate spin-seal operation.
12. Pick and place function for unloading spin-seal process.
13. DOP test station with automatic reject handling.
14. Labeling station for industrial filters.
15. Manual stop/indexing station in packaging area.

The automated manufacturing process is controlled by a series of programmable logic controllers (PLC) with manual input of component parts into the assembly line. The PLCs control the operation of the various stations and provide input to a database as the components are assembled into a final product and tested to ensure quality of the product. Initially, the components that are used to assemble the filter canister are delivered by lot and controlled by lot control numbers. Such components include the filter canister housing and cover, an upper and lower fines filter and upper and lower retainer, charcoal filter media, aerosol filter, and urethane sealant. The lot number is recorded in a database for each component used in manufacturing the filter canister.

Referring now to FIG. 1, at station 8, prior to the start of production, empty pallets are fed onto the production line from the return conveyor. The index station is build around two separate stops. The stops are placed so the pallet in the first stop does not interfere with the pallet in the second stop. By this mode, there will only be one pallet at a time sent into the conveyor system. The PLC system controlling the indexing station will synchronize the feeding of pallets with the descending part of the return conveyor. Each pallet is generally rectangular in shape, having an indexing key on each corner thereof to allow the pallet to be placed on the conveyor in any configuration.

In the next step, at station 11, an empty canister body is manually placed on the pallet. The canister body will have been prepared with a lower retainer element and a lower fines filter in place. The indexing unit is built around two mechanical stop gates together with the necessary number of limit switches to have full control of all functions. The indexing command from the operator is done by pushing a button. The PLC control system can be set to index any number of pallets for each push. This allows the operator to handle a number of canisters in the same operation without to be forced to push the button for each canister.

In the next step, at station 14, the lower retainer element and lower fines filter is ultrasonically welded to the canister body. A lift cylinder will lift the pallet ring with the canister housing and its loose fines filter and retainer to a welding position. Then a circular welding horn will weld the assembly together. The PLC control system for this station automatically controls the indexing. If a pallet is placed in operating position and if there is a “system ok” to process the canister, it will be automatically processed and shipped to the next station. At this station 14, the canister is assigned a barcode for tracking its progress through the manufacturing procedure.

In the next step, at station 17, the canister body is filled with activated charcoal. Activated charcoal is charcoal that has been treated with oxygen to open up millions of tiny pores between the carbon atoms and is widely used to adsorb odorous or colored substances from gases or liquids. Activated charcoal is good at trapping other carbon-based impurities (“organic” chemicals), as well as things like chlorine. Many other chemicals are not attracted to carbon at all—sodium, nitrates, etc.—so they pass right through. This means that an activated charcoal filter will remove certain impurities while ignoring others. It also means that, once all of the bonding sites are filled, an activated charcoal filter stops working. At that point, the filter must be replaced.

The charcoal dosing is built around a volumetric filling device. The PLC control system for this station automatically controls the indexing. The filling volume can be continuously adjusted within a pre-determined span. When filling the canister the charcoal is dropped into a filling tube with a nozzle and through a number of nettings for optimal distribution of charcoal particles in the canister, generally referred to as snowstorm filling. During this filling, the canister is pressed hermetically against the tube to minimize the amount of charcoal particles in the air. The activated charcoal for filling in the canisters is held in a buffer tank that is built as a stainless steel silo. The holding capacity of the buffer tank is approx. 40 liters. Three level switches are built into the buffer tank for optimal control of the buffer tank level. The two levels “full” and “fill” is used by the PLC control system to run a vacuum filling device. The buffer tank level should always be between those two levels. A third level switch is used for alarm when the buffer tank level is too low for operation. When the third level switch is activated, the PLC system stops the process and gives an audible and visual alarm. The vacuum transport and buffer tank filling device is also operated by the PLC control system. A vacuum is generated by a pneumatic device and the charcoal is sucked through a hose up to the buffer tank. Excess air will be filtered before being exhausted.

After the canister is filled, the next step, at station 20, is to determine the amount of activated charcoal in the canister, by weight. A scale is mounted on a lift cylinder that will lift the canister housing with its charcoal fill free from the pallet in order to accurately weigh the canister assembly. The PLC control panel on this station is used for setting the upper and lower limits for approved canister assemblies. The data associated with the weight of the activated charcoal is recorded in the database, associated with the barcode for the particular canister. If the canister does not meet the weight requirements, it will automatically be lifted onto a separate reject track, as depicted at station 23. Those pallets that have insufficient weight can be emptied and returned to the production line for refilling with charcoal.

In the next step, at station 26, an upper fines filter and upper retainer element is manually placed into the canister. The indexing unit is built around two mechanical stop gates together with the necessary number of limit switches to have full control of all functions. The electrical control system is built around a separate and small PLC just operating the indexing. The indexing command from the operator is done by pushing a button. The PLC control system can be set to index any number of pallets for each push.

At the next station 29, the upper retainer and upper fines filter is ultrasonically welded to the canister body. The PLC control system for this station automatically controls the indexing. To minimize the time of operation as well increase the precision in the station, a centering rod comes down and meets the centre of the upper retainer. The rod acts like a "retainer in place control" device as well. If there is no retainer in place, the process stops and sends an alarm. With a retainer in place, a lift cylinder lifts and presses the canister against an anvil with about 1500 Newton of force. This press will immobilize the charcoal bed. With the canister pressed against the anvil the weld process can start. In this sequence, actuators press the weld horns against the outer periphery of the canister and the ultrasonic weld will start. After the weld is done, the actuators are released and an indexing turn will take place for a new weld process before the function is completed.

At station 32, the filter canister is rinsed to remove any stray dust and debris. The PLC control system for this station automatically controls the indexing. The canister assembly will be lifted by a lifting cylinder and passed to a sealing position where plumbing will allow a pulse of compressed air to purge the assembly and where the released fine charcoal particles will be removed by a vacuum system.

In the next step, at station 35, a pleated aerosol HEPA filter is placed in the canister body, on top of the upper retainer. A canister lid is also manually placed on the canister body. The PLC control system for this station automatically controls the indexing.

At station 38, the lid is ultrasonically welded to the canister body. With a lid in place (controlled by a limit switch), a lift cylinder lifts the canister and its anvil from the pallet. With the canister lifted, an ultrasonic weld actuator presses the weld horn against the lid and the weld process starts. After finishing the weld process, the canister is lowered to the pallet and the pallet is shipped down stream to the next workstation.

The spin-seal operation occurs at station 41. When a pallet comes in to the process position in the indexing station the PLC waits for an OK that the corresponding spin station in the Spin Seal Process is empty. If so a Pick and Place robot picks the filter in the pallet and places it in the spin seal station. During this movement, ink-jet marking takes place (station 44) to assign a unique serial number to the canister. The Ink Jet unit is fully computerized and programmable. Any message or code can be put in over the keyboard. The unique serial number associates the lot numbers for each component part, the actual weight of activated charcoal loaded, the date and time of manufacture, and the results of tests performed in the following steps at station 47.

In the spin seal process, a small amount of liquid urethane is squirt into the top opening of the canister lid. The canister is then rapidly spun to ensure the urethane fills the area around the pleated aerosol filter. This insures that air cannot bypass the aerosol filter portion of the canister before it enters the charcoal portion of the canister. The cycle is timed to allow the urethane to cure before moving the canister to the next station. The robot then waits for a new ready-sealed filter to be picked from the Spin Seal Process. When this filter is in position, the robot picks it and places it on the pallet. The pallet will then be shipped down streams to the next process.

In an alternate embodiment, such as when the production process is producing charcoal only filters, the spin seal process can be "bypassed" by pressing a button on the control panel.

After the canister has been sealed and marked, the next step is to test the canister, at station 47. The testing station 47 enables two types of tests: an airflow resistance test and a DOP test. The airflow resistance test indicates the amount of force required to pass air through the filter assembly. A minimum and maximum specification can be programmed into the PLC, which records the specific results of the test for each canister. When the production process is aligned for production of charcoal only filters the testing process may be adjusted to provide only leakage testing by pressing a button on the control panel.

The DOP (Di-octyl Phthalate) test measures filtration efficiency by measuring and comparing the concentration of DOP in the inlet and outlet air streams. With a filter/canister in place, a lift cylinder lifts the canister up against an anvil with a gasket. A DOP test machine meeting automation requirements is plumbed to the lifting chucks of the process. With the canister lifted, the PLC control system initiates the DOP test process. In this test, DOP is evaporated by heat and condensed to produce aerosol of 0.3-micron particles with very little variation in size. The aerosol is introduced to the unit being tested and light scattering, due to particle concentration, is measured at the inlet and outlet of the unit. Because light scattering varies in direct proportion to particle concentration, the collecting efficiency of the unit can be expressed as a function of the difference in light scattering measured at the inlet and outlet at any given time.

If the canister fails the tests (station 50), the control system lowers the filter into the pallet and when indexed the pallet will be transferred over to a reject track to be labeled and discarded, station 53. When a set and programmable number of rejects have been processed, the control system alerts the operator in charge that something is out of order.

If the canister passes the tests (station 50), it is labeled with an appropriate OSHA label. OSHA requires manufacturers to color-code cartridges according to the substances they rebuff. OSHA's color scheme is as follows:

Black—organic vapors
White—acid gas
Green—ammonia gas
Blue—carbon monoxide
Purple—radioactive materials
Yellow—mixture of acid gases and organic vapors The OSHA rules permit combinations of colors for other contaminant combinations. A black cartridge with a gray pre-filter, for instance, protects against particulates and organic vapors.

With a filter in place, a lift cylinder lifts the canister against a rotating anvil. With the canister lifted and rotated, a "label attach" command is sent from the control system. The labeler feeds a label in the same speed as the filter canister and attaches it to the canister body. After the labeling process is complete, the pallet is shipped down stream to the next workstation. When the production process is aligned for production of military canisters, the labeling process may be "bypassed" by pressing a button on the control panel.

The final indexing station, at 59, enables manual packaging of completed canisters for shipping and delivery. The indexing unit is built around two mechanical stop gates together with the necessary number of limit switches to have full control of all functions. The indexing command from the operator is done by pushing a button. The PLC control system can be set to index any number of pallets for each push.

In general, each automatic workstation is a completely automatic machine that is capable of handling pallets with filter canisters in and out of the workstation, as well as running the process in manual, semiautomatic, and in full automatic mode.

An advantage of this manufacturing process is that each step of the manufacture is recorded for each individual filter canister, as well as the results of required testing. This provides quality control for the finished product and enables trend analysis. If it is determined that a filter canister has failed to perform adequately, it becomes a simple matter to identify other possibly similarly situated filter canisters having components from the same lot, manufactured on the same day, or having similar test results, in the event a recall is required. Trends in the testing and analysis conducted during manufacture can also indicate a need for preventive maintenance on the assembly line itself.

The invention has been described with references to a preferred embodiment. While specific values, relationships, materials and steps have been set forth for purposes of describing concepts of the invention, it will be appreciated by persons skilled in the art that numerous variations and/or modifications may be made to the invention as shown in the specific embodiments without departing from the spirit or scope of the basic concepts and operating principles of the invention as broadly described. It should be recognized that, in the light of the above teachings, those skilled in the art can modify those specifics without departing from the invention taught herein. Having now fully set forth the preferred embodiments and certain modifications of the concept underlying the present invention, various other embodiments as well as certain variations and modifications of the embodiments herein shown and described will obviously occur to those skilled in the art upon becoming familiar with such underlying concept. It is intended to include all such modifications, alternatives and other embodiments insofar as they come within the scope of the appended claims or equivalents thereof. It should be understood, therefore, that the invention may be practiced otherwise than as specifically set forth herein. Consequently, the present embodiments are to be considered in all respects as illustrative and not restrictive.

What is claimed is:

1. A method for manufacturing filter canisters, comprising the steps of:

providing a canister having a body and a lid;

assigning a barcode identification to said canister body;

filling a predetermined amount of activated charcoal in said body;

recording the weight of said activated charcoal and associating said weight with said barcode identification;

assigning a unique serial number to said canister and associating said barcode identification with said unique serial number; and recording said weight and serial number in a retrievable database wherein said database maintains product data for said canister according to its unique serial number.

2. The manufacturing method according to claim 1, further comprising:

performing testing on said canister; and recording the results of said testing in said database associated with said serial number.

3. The manufacturing method according to claim 2, wherein said testing further comprises an airflow resistance test.

4. The manufacturing method according to claim 2, wherein said testing further comprises a DOP test.

5. The manufacturing method according to claim 1, further comprising:

after filling a predetermined amount of activated charcoal in said body, placing an aerosol filter in said body.

6. The manufacturing method according to claim 5, further comprising:

sealing said aerosol filter in said body.

7. The manufacturing method according to claim 6, wherein said sealing process comprises:

squirting a small amount of sealant into said canister body; and spinning said canister body to ensure the sealant fills the area around said aerosol filter so that air cannot bypass said aerosol filter in the canister.

8. The manufacturing method according to claim 1, further comprising:

before filling a predetermined amount of activated charcoal in said body, installing a lower retainer and fines filter in said canister body.

9. The manufacturing method according to claim 1, further comprising:

after filling a predetermined amount of activated charcoal in said body, installing an upper retainer and fines filter in said canister body.

10. The manufacturing method according to claim 1, further comprising:

ultrasonically welding said lid to said body.

11. The manufacturing method according to claim 1, further comprising:

labeling said canister according to NIOSH specification.

12. The manufacturing method according to claim 1, further comprising:

recording in said database, lot numbers corresponding to component parts for said filter canister and associating said lot numbers with said barcode identification.

13. A method for manufacturing filter canisters, comprising the steps of:

providing a canister having a body and a lid;

placing a lower retainer element and fines filter in said body;

ultrasonically welding said lower retainer element and said fines filter to said body;

assigning a barcode identification to said body;

filling a predetermined amount of activated charcoal in said body;

determining the weight of said charcoal within said body;

rejecting said canister if said weight is not within a predetermined limit;

if said weight is within a predetermined limit, recording the weight of said activated charcoal and associating said weight with said barcode identification for said canister body;

placing an upper retainer element and fines filter in said body on top of said activated charcoal;

compressing said charcoal and ultrasonically welding said upper retainer element and said fines filter to said body;

assigning a unique serial number to said canister and associating said barcode identification with said unique serial number; and recording said weight and serial number in a retrievable database wherein said database maintains product data for said filter canister according to its unique serial number.

14. The manufacturing method according to claim 13, further comprising:

performing testing on said canister; and recording the results of said testing in said database associated with said serial number.

15. The manufacturing method according to claim 14, wherein said testing further comprises an airflow resistance test.

16. The manufacturing method according to claim 14, wherein said testing further comprises a DOP test.

17. The manufacturing method according to claim 13, further comprising:

after compressing said charcoal and ultrasonically welding said upper retainer element and said fines filter to said body, placing an aerosol filter in said body.

18. The manufacturing method according to claim 17, further comprising:

sealing said aerosol filter in said body.

19. The manufacturing method according to claim 13, further comprising:

ultrasonically welding said lid to said body.

20. The manufacturing method according to claim 13, further comprising:

labeling said canister according to NIOSH specification.

21. The manufacturing method according to claim 13, further comprising:

recording in said database, lot numbers corresponding to component parts for said filter canister and associating said lot numbers with said barcode identification.

* * * * *